United States Patent [19]
Sato et al.

[11] Patent Number: 5,529,639
[45] Date of Patent: Jun. 25, 1996

[54] FLUX USED IN THE LOW-TEMPERATURE BRAZING AND A METHOD OF FLUX BRAZING A LOW-MELTING ALUMINUM MATERIAL

[75] Inventors: Shoichi Sato; Seiji Tasaki; Masahiro Yoshida; Takeshi Otsubo, all of Oyamashi, Japan

[73] Assignee: Showa Aluminum Corp., Osaka, Japan

[21] Appl. No.: 322,565

[22] Filed: Oct. 13, 1994

[30] Foreign Application Priority Data

Dec. 28, 1993 [JP] Japan ................................ 5-337663

[51] Int. Cl.⁶ ............................................ B23K 35/365
[52] U.S. Cl. .................................... 148/26; 228/223
[58] Field of Search .......................... 148/26; 228/183, 228/223, 262.51

[56] References Cited

U.S. PATENT DOCUMENTS

| | | | |
|---|---|---|---|
| 1,968,984 | 8/1934 | Binder | 148/26 |
| 2,299,164 | 10/1942 | Miller | 148/26 |
| 3,636,301 | 1/1972 | Yakovievich | 148/26 |
| 3,704,149 | 11/1972 | DeLong | 148/26 |
| 3,865,578 | 2/1975 | Takashima | 148/26 |
| 3,892,561 | 7/1975 | Takahima | 148/26 |
| 4,643,348 | 2/1987 | Takahashi | 148/26 |

FOREIGN PATENT DOCUMENTS

| | | |
|---|---|---|
| 0225406A1 | 6/1987 | European Pat. Off. . |
| 2071016 | 9/1971 | France . |
| 231816 | 5/1925 | United Kingdom . |
| 747813 | 4/1956 | United Kingdom . |

OTHER PUBLICATIONS

Patent Abstract of Japan; vol. 3, No. 118 (C–60) 4 Oct. 1979 & JP-A-54 100956; (Sumitomo Denki Kogyo) 8 Sep. 1969. (Abstract).

*Primary Examiner*—Melvyn Andrews
*Attorney, Agent, or Firm*—Armstrong, Westerman, Hattori, McLeland & Naughton

[57] ABSTRACT

A novel flux is provided for use in the low-temperature brazing aluminum materials of varied compositions, the flux being composed of a KCl—NaCl—BaCl$_2$ base and 0.5– 5.0 wt. % of LiF and/or 1.0–10.0 wt. % of ZnCl$_2$ added to the base. A method of flux brazing a low-melting aluminum material is also provided, and the method is carried out by applying such a novel flux as well as a low-melting brazing agent to the aluminum material portions to be adjoined. The brazing agent is composed of an Al—Si—Zn alloy which contains 3–12% by weight of Si and 15–70% by weight of Zn.

20 Claims, 1 Drawing Sheet

FLUX USED IN THE LOW-TEMPERATURE BRAZING AND A METHOD OF FLUX BRAZING A LOW-MELTING ALUMINUM MATERIAL

FIELD OF THE INVENTION

The present invention relates to a flux for use in the low-temperature brazing of certain low-melting aluminum materials, and also relates to a method of flux brazing the aluminum materials wherein the flux provided herein is used.

The word 'aluminum' used in this specification is meant to include aluminum and its alloys.

BACKGROUND OF THE INVENTION

Generally, low-melting brazing agents have been used to braze or solder certain low-melting aluminum materials. Low-melting fluxes have also been employed in such brazing or soldering operations so as to remove oxides from the portions where the materials should be adjoined. In manufacture for example of heat exchangers or suction manifolds, cast pieces of a low-melting aluminum have been fixedly adjoined to other parts, by using some low-melting brazing agents composed of an Al— Si—Zn alloy. As for the fluxes, chloride fluxes such as KCl—NaCl—LiCl flux and KCl—NaCl—BaCl$_2$ flux as well as fluoride fluxes have been used in the low-temperature brazing. A reactive flux composed mainly of ZnCl$_2$ has a melting point lower than the fluxes exemplified just above, and has been used sometimes in the low-temperature soldering. Those prior art fluxes used in combination with the low-melting brazing agent are all problematic as will be detailed below since the melting point of the Al—Si—Zn alloy used in brazing said aluminum cast pieces is 530°–560° C.

KCl—NaCl—LiCl alloy fluxes included in the chloride fluxes are comparatively active but so hygroscopic that the muffles, mesh belts and tools or devices are likely to be seriously damaged within an oven filled with N$_2$ gas in which the brazing is conducted. On the other hand, KCl—NaCl—BaCl$_2$ fluxes which are not so hygroscopic are suited for use in the brazing carried out within the oven. However, their activity is comparatively low and their melting point of about 540° C. is undesirably high, so that they are not proper fluxes for use in the low-temperature brazing.

The fluoride fluxes tend to react with Mg present in the aluminum alloy articles to be brazed, thereby producing certain compounds of Mg—F series. If such Mg—F compounds are left unremoved, then the quality of the brazed aluminum articles will be affected to a significant extent. Thus, the fluoride fluxes must be used only to braze low-Mg cast pieces which contain 0.5% or less by weight of Mg.

The reactive fluxes which are composed mainly of ZnCl$_2$ will react with aluminum element constituting the aluminum articles. A large amount of harmful gases produced through the reaction will corrode the muffles, mesh belts and tools in the oven. A temperature at which such a reaction takes place is low and about 400° C. Consequently, the reactive fluxes are not employable in the brazing process using the low-melting Al—Si—Zn brazing agent.

Objects of the present invention which was made to resolve these problems are therefore to provide a novel flux which proves its merits when used to assist the low-temperature brazing of low-melting aluminum materials of various chemical compositions, as well as a method of flux brazing the low-melting aluminum materials under the presence of the novel flux.

DETAILED DESCRIPTION OF THE INVENTION

Figure 1:
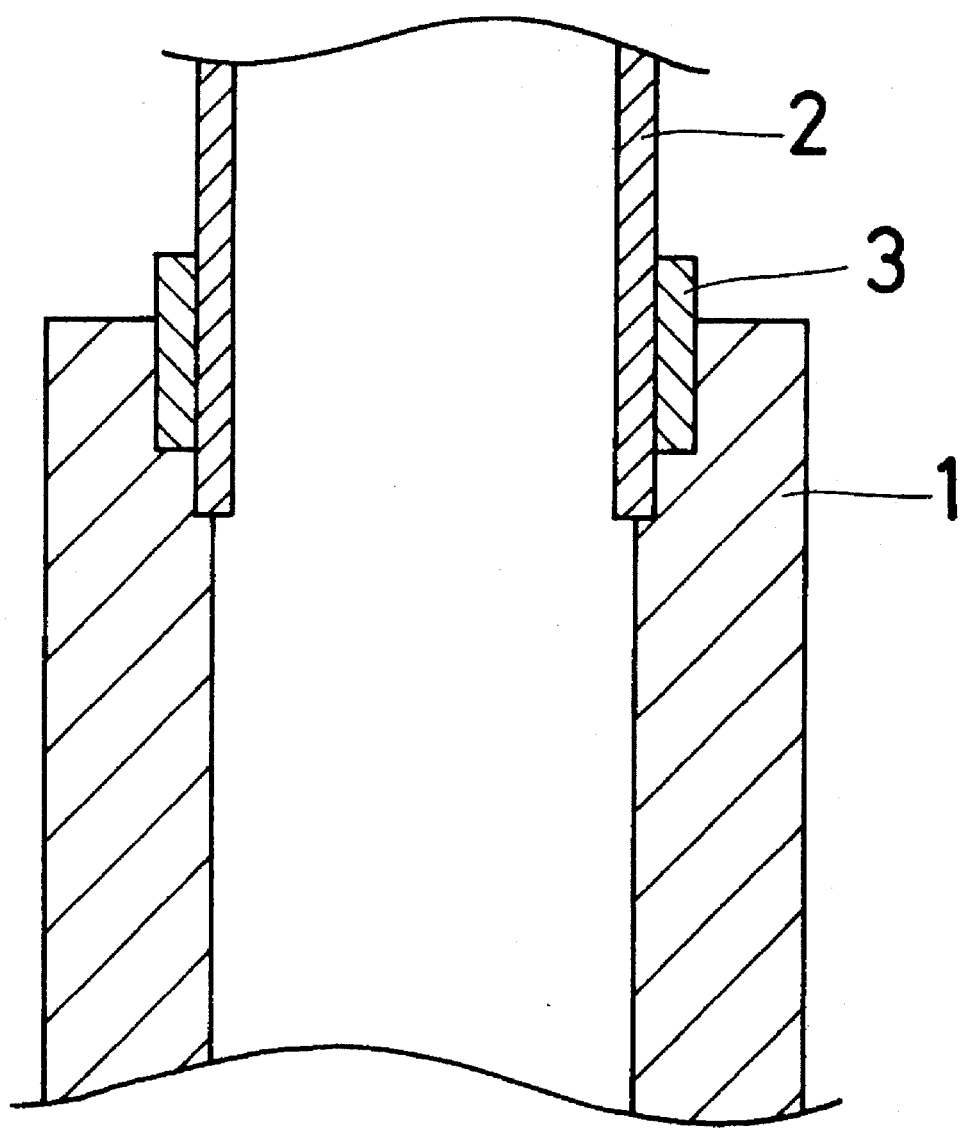
FIG. 1 is a vertical cross section of a joint which was used in the brazeability test conducted in an embodiment.

From a first aspect, the invention provides a novel flux for use in the low-temperature brazing, which flux comprises, in addition to KCl—NaCl—BaCl$_2$ as its base component, at least one compound selected from a group consisting of LiF and ZnCl$_2$ blended with the base component.

In detail, the flux provided by the invention from the first aspect thereof is composed of KCl—NaCl—BaCl$_2$ as the base component and does further contain 0.5–5.0% by weight of LiF and/or 1.0–10.0% by weight of ZnCl$_2$. More preferable contents of LiF and ZnCl$_2$ in the flux for use in the low-temperature brazing are 1.0–3.0% wt. % and 3.0–7.0 wt. %, respectively.

The KCl—NaCl—BaCl$_2$ base is employed herein because it is less hygroscopic. Preferably, this flux base is composed of: 23.0–27.0 wt. % of KCl; 15.0–19.0 wt. % of NaCl; and 49.0–53.0 wt. % of BaCl$_2$. It may be possible that this flux base further contain a little amount of: a fluoride flux such as KAlF$_4$, MgF$_2$ or CaF$_2$; and/or a eutectic mixture of KF+AlF$_3$.

LiF and ZnCl$_2$ as the important additives do function not only to lower the melting point of the flux provided herein for use in the low-temperature brazing but also to improve the activity of the flux. A poor content of LiF less than 0.5 wt. % will diminish these effects, but an excessive amount of LiF more than 5.0 wt. % will rather raise the melting point. Thus, the content of LiF must be 0.5–5.0 wt. %, and more preferably 1.0–3.0 wt. %. On the other hand, a poor content of ZnCl$_2$ less than 1.0 wt. % will give a flux devoid of such effects of lowering the melting point and improving the activity. However, a superfluous amount of ZnCl$_2$ more than 10.0 wt. % will render the flux too hygroscopic to treat with easily, and cause a serious damage to the oven and tools equipped therein. Thus, the content of ZnCl$_2$ must be 1.0–10.0 wt. %, and more preferably 3.0–7.0 wt. %.

From a second aspect, the invention provides a novel method of flux coating the low-melting aluminum materials, the method employing the flux for use in the low-temperature brazing together with a low-melting brazing agent to be supplied to material portions which are to be brazed, wherein the brazing agent is included in the Al—Si—Zn series containing 3–12 wt. % of Si and 15–70 wt. % of Zn, and wherein the flux comprises, in addition to KCl—NaCl—BaCl$_2$ as its base component, at least one compound selected from a group consisting of LiF and ZnCl$_2$ blended with the base component, with LiF contained at 0.5–5.0 wt. % and ZnCl$_2$ contained at 1.0–10.0 wt. %. The Si content in the brazing agent is preferably 3–6 wt. % and Zn content therein is also preferably 20–50 wt. %.

The low-melting aluminum materials which are to be brazed by the method need not be of any specific chemical composition, provided that their melting point is 565° C. or higher. They may be castable, or alternatively ductile materials. The flux proposed herein is a chloride flux, so that the low-melting aluminum materials may be any aluminum alloys containing Mg.

The Al—Si—Zn brazing agent employed herein is characterized by its Si content of 3–12 wt. % and its Zn content of 15–70 wt. %. Due to this composition, the melting point of this brazing agent is about 530° to 560° C. Such a comparatively low melting point, as compared with many other brazing agents for aluminum materials, is suited for use with the flux provided herein for the low-temperature brazing. If Si or Zn content deviates from those range, then the melting point will rise to an extent undesirable for the low-temperature brazing to be done smoothly. The Al—Si—Zn brazing agent may further contain any corrosion resistant metal and unavoidable impurities. A more preferable content and the most preferable content of Si are 3–10 wt. % and 3–6 wt. %, respectively. A more preferable content and the most preferable content of Zn are 20–50 wt. % and 30–40 wt. %, respectively.

In more detail, the flux which is based on the KCl—NaCl—BaCl$_2$ composition according to the first aspect and further contains 0.5–5.0 wt. % of LiF and/or 1.0–10.0 wt. % of ZnCl$_2$ has a melting point lower than that of many prior art KCl—NaCl—BaCl$_2$ fluxes by about 20°–50° C., and has an activity higher than them. LiF content of 1.0–3.0 wt. % and ZnCl$_2$ content of 3.0–7.0 wt. % will render lowest the melting point and further raise the activity.

Thus, such a flux will optimize the low-temperature brazing of the low-melting aluminum materials so as to be effected at a brazing temperature, if used together with the Al—Si—Zn brazing agent comprising 3–12 wt. % of Si and 15–70 wt. % of Zn. Si content of 3–6 wt. % and Zn content of 20–50 wt. % in the agent will optimize the brazing, cooperating with the flux of the aforementioned composition.

In summary, the flux provided herein is scarcely hygroscopic similarly to the other prior art KCl—NaCl—BaCl$_2$ fluxes. Therefore, the brazing oven or the tools therein are protected from damage, and the flux can be dispersed in water so as to form an inexpensive dispersion which makes it efficient to rapidly apply the flux on a much larger scale. Since the chloride flux is devoid of fluorine, contrarily to the fluoride fluxes, there is no fear of producing a Mg—F which impair the quality of the brazed articles. The flux provided herein can thus be advantageously used to braze any low-melting aluminum materials which may contain

THE PREFERRED EMBODIMENTS

Now, an embodiment of the flux for use in the low-temperature brazing as well as an embodiment of the method of flux brazing of the low-melting aluminum materials will be described referring to the drawings.

Some flux samples of varied compositions were prepared at first, using as their base a conventional chloride flux KCl—NaCl—BaCl$_2$ available on the market. This base, whose trade name was 'STF-A', was composed of: 25.4 wt. % of KCl; 16.8 wt. % of NaCl; 50.9 wt. % of BaCl$_2$; 1.0 wt. % of KAlF$_4$; 1.0 wt. % of MgF$_2$; and 1.9 wt. % of CaF$_2$. Next, LiF was added to the base at six varied contents: 0 wt. %, 0.5 wt. %, 1 wt. %, 3 wt. %, 5 wt. % and 10 wt. %. ZnCl$_2$ was also blended with the base at six varied contents: 0 wt. %, 1 wt. %, 3 wt. %, 5 wt. %, 10 wt. % and 15 wt. %. Thus, 36 (thirty six) kinds of fluxes were prepared for use in the low-temperature brazing. As for the low-melting brazing agent, two Al—Si—Zn alloys were prepared, wherein one of them contained 5 wt. % of Si and 40 wt. % of Zn, with the other containing 10 wt. % of Si and 20 wt. % of Zn.

The brazing tests were carried out in the following manner, using the fluxes and the agents of the described compositions.

Each flux was dispersed in water to give a suspension of a concentration of 60%. On the other hand, a length of pipe 2 made of an A6063 aluminum alloy was inserted in another length of pipe 1 which was a cast aluminum alloy AC4C, so as to preassembly a joint shown in FIG. 1. Then, 1 gram of each of 36 suspensions was applied by the brushing technique to the adjoined pipe portion of each joint. Each joint was subsequently heated to dry in air at 150° C. for 15 minutes. Each of the two brazing agents 3 which were ring-shaped was attached to the adjoined portion, before the joints were heated in an atmosphere at (an effective temperature of) 550° C. for 3 minutes. The atmosphere had a dew point of –(minus) 30° C. and contained 50 ppm of O$_2$ gas. After brazing the joints, each of their adjoined portions was visually inspected to evaluate the brazeability. Since the two brazing 'agents' gave the same results, they are recited in Table 1 to give only one rating for each pair of two agents.

As will be seen in Table 1, the flux provided herein is an excellent flux which improves the low-temperature brazing when used together with the low-melting brazing agent.

TABLE 1

| ZnCl$_2$ | LiF | | | | | |
|---|---|---|---|---|---|---|
| | 0 wt % | 0.5 wt % | 1 wt % | 3 wt % | 5 wt % | 10 wt % |
| 0 wt % | X | O | ⊙ | ⊙ | O | Δ |
| 1 wt % | O | O | ⊙ | ⊙ | O | Δ |
| 3 wt % | ⊙ | ⊙ | ⊙ | ⊙ | O | Δ |
| 5 wt % | ⊙ | ⊙ | ⊙ | ⊙ | O | Δ |
| 10 wt % | O | O | O | O | O | Δ |
| 15 wt % | Δ | Δ | Δ | Δ | Δ | Δ |

Notes:
⊙ = Excellent brazing
O = Good brazing
Δ = Brazed but partially produced non-uniform fillets
X = Brazing agent failing to spread uniform

What is claimed is:

1. A flux for use in the low-temperature brazing, the flux composed of a KCl—NaCl—BaCl$_2$ base and 1.0–10.0% by weight ZnCl$_2$, or 0.5–5.0% by weight LiF and 1.0–10.0% by weight ZnCl$_2$.

2. A flux as defined in claim 1, wherein the flux contains 1.0–3.0% by weight of LiF.

3. A flux as defined in claim 1, wherein the flux contains 3.0–7.0% by weight of ZnCl$_2$.

4. A flux as defined in claim 1, wherein the flux contains 1.0–3.0% by weight of LiF and 3.0–7.0% by weight of ZnCl$_2$.

5. A method of flux brazing a low-melting aluminum material, the method comprising the steps of: preparing the aluminum material; then applying to adjoined portions thereof a required amount of a low-melting brazing agent and a required amount of a flux; and subsequently heating the portions together with the agent and the flux so as to braze the portions one to another, wherein the brazing agent is essentially composed of an Al—Si—Zn alloy which contains 3–12% by weight of Si and 15–70% by weight of Zn, and wherein the flux is composed of a KCl—NaCl—BaCl$_2$ base and at least one compound selected from a group consisting of LiF and ZnCl$_2$, wherein LiF is contained at a concentration of 0.5–5.0% by weight and ZnCl$_2$ is contained at a concentration of 1.0–10.0% by weight.

6. The method as defined in claim 5, wherein the flux contains 1.0–3.0% by weight of LiF.

7. The method as defined in claim 5, wherein the flux contains 3.0–7.0% by weight of ZnCl$_2$.

8. The method as defined in claim 5, wherein the flux contains 1.0–3.0% by weight of LiF and 3.0–7.0% by weight of ZnCl$_2$.

9. The method as defined in claim 5, wherein the brazing agent contains 3–6% by weight of Si.

10. The method as defined in claim 5, wherein the flux contains 1.0–3.0% by weight of LiF, and the brazing agent contains 3–6% by weight of Si.

11. The method as defined in claim 5, wherein the flux contains 3.0–7.0% by weight of ZnCl$_2$, and the brazing agent contains 3–6% by weight of Si.

12. The method as defined in claim 5, wherein the flux contains 1.0–3.0% by weight of LiF and 3.0–7.0% by weight of ZnCl$_2$, and the brazing gent contains 3–6% by weight of Si.

13. The method as defined in claim 5, wherein the brazing agent contains 20–50% by weight of Zn.

14. The method as defined in claim 5, wherein the flux contains 1.0–3.0% by weight of LiF, and the brazing agent contains 20–50% by weight of Zn.

15. The method as defined in claim 5, wherein the flux contains 3.0–7.0% by weight of ZnCl$_2$, and the brazing agent contains 20–50% by weight of Zn.

16. The method as defined in claim 5, wherein the flux contains 1.0–3.0% by weight of LiF and 3.0–7.0% by weight of ZnCl$_2$, and the brazing agent contains 20–50% by weight of Zn.

17. The method as defined in claim 5, wherein the brazing agent contains 3–6% by weight of Si and 20–50% by weight of Zn.

18. The method as defined in claim 5, wherein the flux contains 1.0–3.0% by weight of LiF, and the brazing agent contains 3–6% by weight of Si and 20–50% by weight of Zn.

19. The method as defined in claim 5, wherein the flux contains 3.0–7.0% by weight of ZnCl$_2$, and the brazing agent contains 3–6% by weight of Si and 20–50% by weight of Zn.

20. The method as defined in claim 5, wherein the flux contains 1.0–3.0% by weight of LiF and 3.0–7.0% by weight of ZnCl$_2$, and the brazing agent contains 3–6% by weight of Si and 20–50% by weight of Zn.

\* \* \* \* \*